United States Patent
Bellec et al.

(10) Patent No.: US 9,481,139 B2
(45) Date of Patent: Nov. 1, 2016

(54) PROCESS FOR FORMING A CONTAINER BY SELECTIVE LASER HEATING AND FREE BLOWING

(75) Inventors: Caroline Bellec, Octeville sur Mer (FR); Mikael Derrien, Octeville sur Mer (FR); Guy Feuilloley, Octeville sur Mer (FR); Isabelle Maillot, Octeville sur Mer (FR)

(73) Assignee: SIDEL PARTICIPATIONS, Octeville sur Mer (FR)

( * ) Notice: Subject to any disclaimer, the term of this patent is extended or adjusted under 35 U.S.C. 154(b) by 724 days.

(21) Appl. No.: 13/814,111

(22) PCT Filed: Sep. 19, 2011

(86) PCT No.: PCT/FR2011/052147
§ 371 (c)(1),
(2), (4) Date: May 7, 2013

(87) PCT Pub. No.: WO2012/038652
PCT Pub. Date: Mar. 29, 2012

(65) Prior Publication Data
US 2013/0221579 A1    Aug. 29, 2013

(30) Foreign Application Priority Data
Sep. 20, 2010 (FR) .................................. 10 03731

(51) Int. Cl.
*B29D 22/00* (2006.01)
*B29B 13/02* (2006.01)
*B29C 49/00* (2006.01)
*B29C 49/64* (2006.01)
*B29C 49/78* (2006.01)
(Continued)

(52) U.S. Cl.
CPC ........... *B29D 22/003* (2013.01); *B29B 13/024* (2013.01); *B29C 49/0042* (2013.01);
(Continued)

(58) Field of Classification Search
CPC ... B29D 22/003; B29B 13/024; B29C 49/64; B29C 49/6409; B29C 49/6436; B29C 49/6463; B29C 49/6472; B29C 49/68
USPC ........ 264/458, 461, 473, 476, 485, 492, 495
See application file for complete search history.

(56) References Cited

U.S. PATENT DOCUMENTS

2006/0097417 A1*  5/2006  Emmer ............... B29C 49/0042
                                                                    264/40.1
2008/0305203 A1    12/2008  Plantamura

FOREIGN PATENT DOCUMENTS

EP    2 002 962 A1    12/2008
FR    2 848 906 A1    6/2004
(Continued)

*Primary Examiner* — Stella Yi
(74) *Attorney, Agent, or Firm* — Sughrue Mion, PLLC

(57) ABSTRACT

Method of manufacturing a container (14) from a blank (2) of thermoplastic material having a body (4) extending along a principal axis (A), which comprises:
- A selective heating step in which the body (4) of the blank (2) is exposed to monochromatic or pseudo-monochromatic infrared radiation, the power of which is modulated along the principal axis (A) of the body (4) in such a way that said body has alternating hot annular regions (4A, 4C, 4E, 4G, 4I), the temperature of which is far higher than the glass transition temperature ($T_g$) of the material, and comparatively colder annular regions (4B, 4D, 4F, 4H), the temperature of which is close to the glass transition temperature ($T_g$);
- A forming step in which a fluid under pressure is injected into the blank (2) thus heated, said step being carried out in free expansion.

10 Claims, 6 Drawing Sheets

(51) Int. Cl.
B29C 35/08 (2006.01)
B29K 67/00 (2006.01)

(52) U.S. Cl.
CPC ........... B29C49/6445 (2013.01); *B29C 49/78* (2013.01); *B29C 2035/0822* (2013.01); *B29C 2035/0838* (2013.01); *B29K 2067/00* (2013.01)

(56) References Cited

FOREIGN PATENT DOCUMENTS

| | | |
|---|---|---|
| GB | 2 138 735 A | 10/1984 |
| WO | 2011/006168 A1 | 1/2011 |

* cited by examiner

PROCESS FOR FORMING A CONTAINER BY SELECTIVE LASER HEATING AND FREE BLOWING

CROSS REFERENCE TO RELATED APPLICATIONS

This application is a National Stage of International Application No. PCT/FR2011/052147 filed Sep. 19, 2011, claiming priority based on French Patent Application No. 10 03731 filed Sep. 20, 2010, the contents of all of which are incorporated herein by reference in their entirety.

The invention relates to the manufacture of containers, particularly bottles, jars, by forming from blanks (generally preforms, although it can also include intermediate containers) of plastic material such as polyethylene terephthalate (PET).

The manufacture of containers involves two principal steps: a heating step during which the blanks are exposed to electromagnetic radiation from sources emitting in the infrared range, followed by a forming step during which a gas under pressure is injected into the blanks thus heated, to give them the final shape of the container.

The forming step is generally carried out in a cavity mold in the shape of the container. Depending on the applications, the containers do not necessarily have a shape that is symmetrical in revolution (such as containers that are polygonal or flattened in shape), and the question of the distribution of the material during forming arises. One solution, described in French patent FR 2 703 944 (and in its American equivalent U.S. Pat. No. 5,681,521) in the name of Sidel, consists of the non-uniform (or "selective") heating of the preforms on their periphery so as to eliminate local excess thicknesses and to obtain a wall thickness that is approximately constant everywhere.

However, the applications of such a selective heating are not limited to obtaining a constant wall thickness. Indeed, the French patent FR 2 703 944 describes, in reference to its FIG. 12, a selective heating of a preform on annular portions at a temperature lower than that of the rest of the body in order to create thicker perimetric zones providing mechanical reinforcements facilitating the gripping of the container. However, as indicated in this prior patent, the creation of annular portions at a temperature lower than that of the body cannot in practice be obtained in a simple manner due to the non-directive propagation of the thermal radiation and of the overlapping of radiation from two adjacent tubes (p. 23, l.25-30). The variations in the heating are introduced by reflective and non-reflective zones facing the bodies of the preforms in movement (p. 23, l.31-36, FIG. 13).

However, tests have shown that, although in application of the technique described in the patent FR 2 703 944, the non-uniform distribution of the heating on the periphery of the preforms effectively made it possible to obtain a uniform distribution of the material during the forming of containers that are non-symmetrical in revolution, the creation of annular portions of a temperature lower than that of the rest of the body does not make it possible to obtain extra thicknesses that can truly increase the rigidity of the container. In reality, the temperature variations in the preform are very progressive and limited in amplitude, so that even when reflectors are used, variations in thickness as sharp as those illustrated in FIG. 12 of the aforementioned patent cannot be achieved.

The invention seeks to more effectively use selective heating of preforms (or more generally blanks) for the manufacture of containers.

To that end, the invention proposes a method of manufacturing a container from a blank of thermoplastic material having a body extending along a principal axis, which comprises:

a selective heating step in which the body of the blank is exposed to monochromatic or pseudo-monochromatic infrared radiation, the power of which is modulated along the principal axis of the body in such a way that said body has alternating hot annular regions, the temperature of which is much higher than the glass transition temperature of the material, and comparatively colder annular regions, the temperature of which is close to the glass transition temperature;

a forming step in which a fluid under pressure is injected into the blank thus heated, said step being carried out in free expansion.

The container obtained by this method has high structural rigidity, and a regular shape in spite of the forming being carried out in free expansion. Eliminating a mold makes it possible to achieve substantial economies.

Preferably, in the heating step, the power of the radiation is regulated by zones alternately at a high value and a low value. The power of the radiation can even be modulated so that some annular regions of the body of the blank are not lighted.

In practice, the power of the radiation is preferably modulated so that the peak temperature of the hot annular regions is far higher than the glass transition temperature of the material, and so that the lowest temperature of the cold annular regions is close to the glass transition temperature of the material.

With respect to the forming, it can be carried out in the total absence of any guide surface, or with the provision of a mold bottom to form an annular seat on the container.

The pressure of fluid injected during forming is preferably less than 10 bars; according to one particular embodiment, it is about 5 bars.

The infrared radiation employed can be a laser radiation, for example produced by vertical-cavity surface-emitting laser (VCSEL) diodes.

Other objects and advantages of the invention will be seen from the following description, provided with reference to the appended drawings in which.

Figure 1:
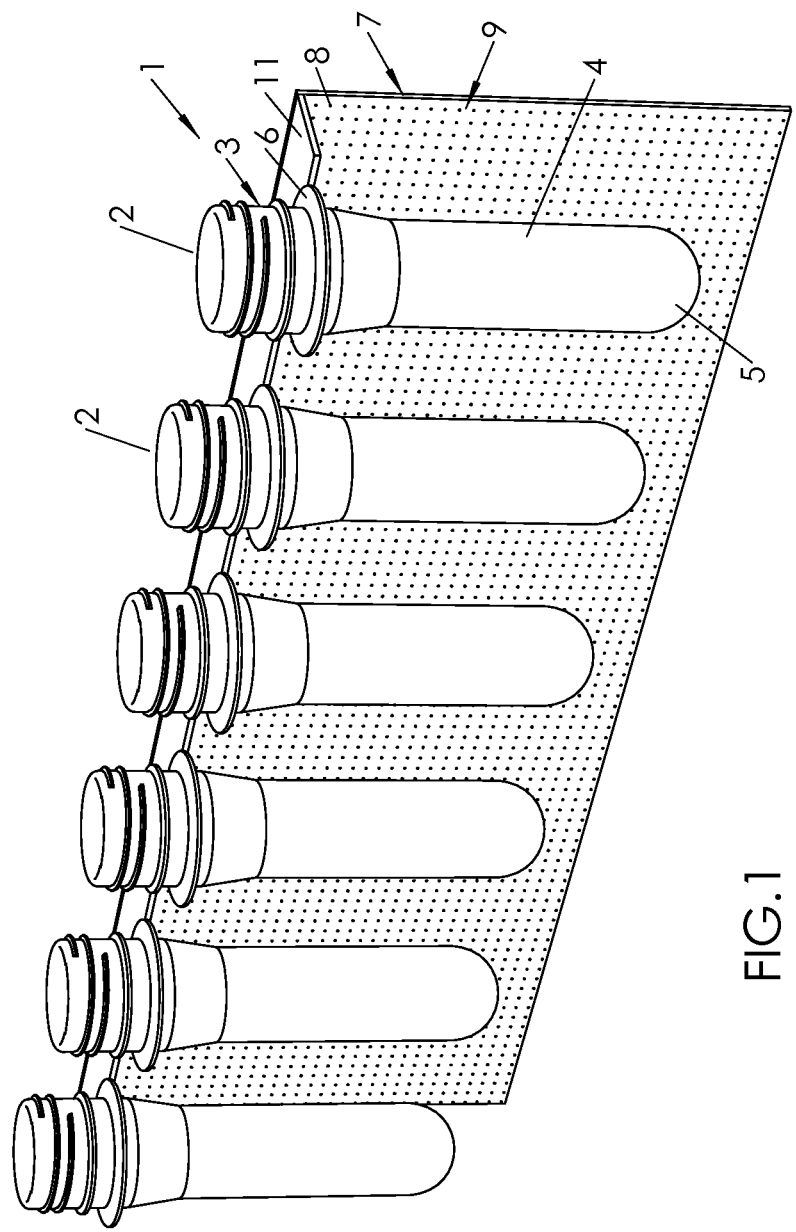
FIG. 1 is a view in perspective partially illustrating a heating unit comprising a wall lined with point infrared sources, in front of which the preforms travel.
Figure 2:
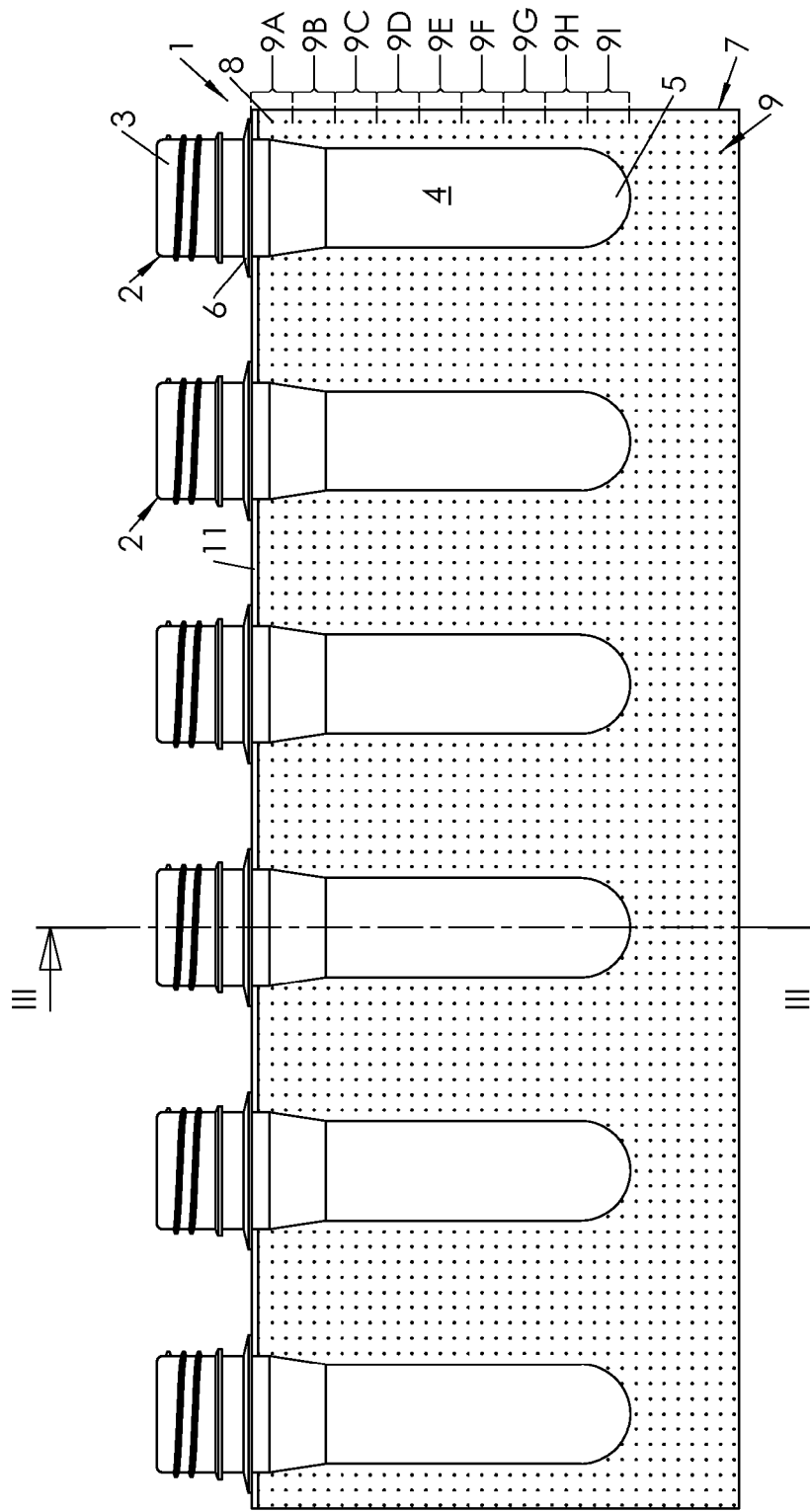
FIG. 2 is a front view of the heating unit of FIG. 1.
Figure 3:
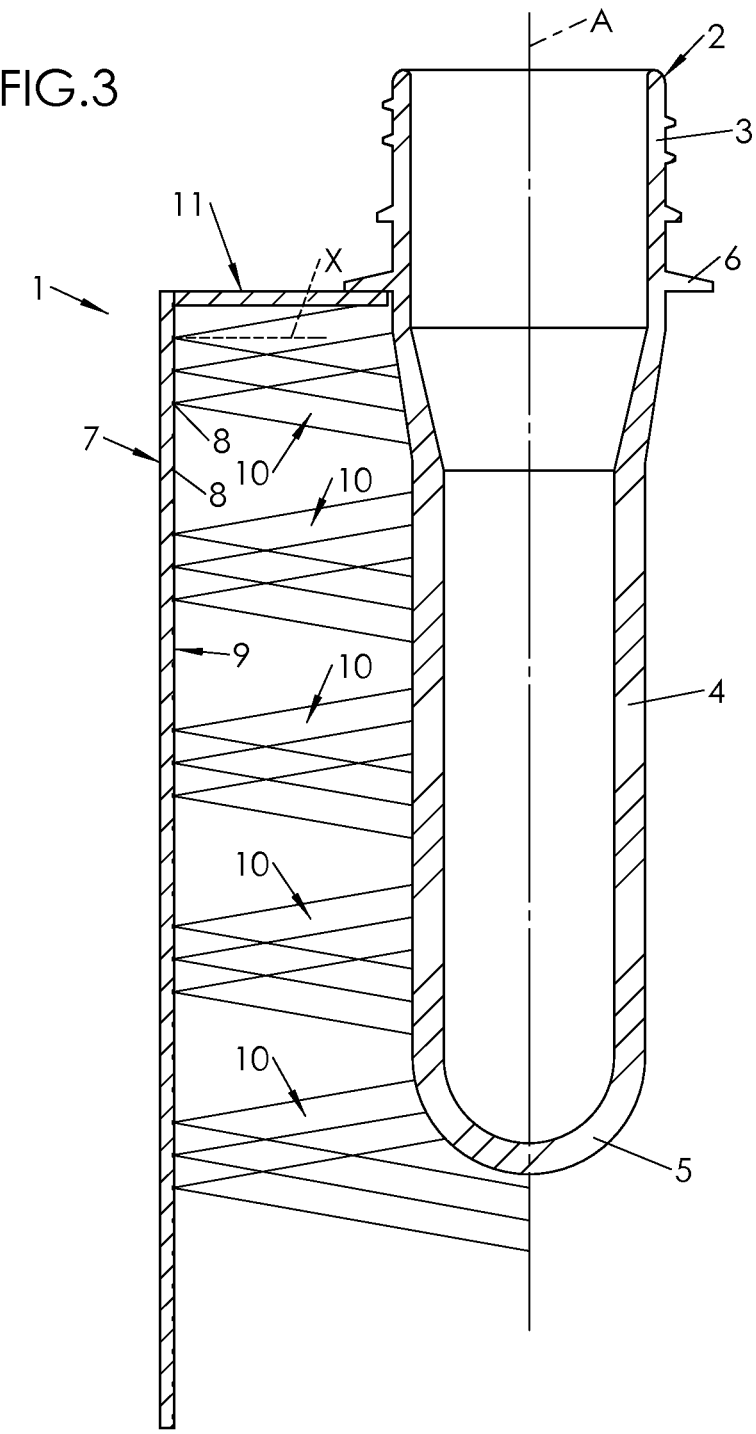
FIG. 3 is a view of the heating unit of FIG. 2, in transverse cross-section along the cutting plane III-III.

Diagrammatically represented in FIGS. 1 to 3 is a unit 1 for heating blanks 2 of containers as they pass by. In this instance, the blanks 2 are preforms, but it could involve intermediate containers having undergone temporary forming operations and intended to undergo one or more subsequent operations to obtain the final containers.

Each preform 2, produced from a thermoplastic material such as polyethylene terephthalate (PET), comprises a neck 3, which is not (or only slightly) heated, the shape of which is final, and a body 4 that terminates opposite the neck 3 in a hemispherical bottom 5.

At the junction between the neck 3 and the body 4, the preform 2 has a collar 6 by which the preform 2 is suspended in the various steps of manufacturing the container.

However, in the heating unit 1, the preforms 2 are attached to pivoting supports called spinners, which drive the preforms 2 in rotation around their principal axis A so as to expose the entire body 4 to the heating.

Represented in FIGS. 1 to 3 are the preforms 2 with the neck 3 upwards, but this representation is arbitrary and illustrative, and the preforms 2 could be oriented with the neck 2 downwards.

The heating unit 1 has a radiating wall 7 in front of which the preforms 2 travel. Said wall 7 is lined with a plurality of electromagnetic radiation sources 8 emitting both monochromatic (or pseudo-monochromatic) and directive electromagnetic radiation towards the preforms 2, in the infrared range.

In theory, a monochromatic source is an ideal source, emitting a sinusoidal wave at a single frequency. In other words, its frequency spectrum is composed of a single ray of zero spectral width (Dirac).

In practice, such a source does not exist, a real source being at best quasi-monochromatic, i.e., its frequency spectrum extends over a band of spectral width that is small but not zero, centered on a principal frequency where the intensity of radiation is maximum. In this description, such a real source is called monochromatic.

Moreover, in this description, a source emitting quasi-monochromatically over a discrete spectrum comprising several narrow bands centered on distinct principal frequencies is considered to be "pseudo-monochromatic." This is also called multimode source.

In practice, the sources 8 are infrared laser diodes organized by juxtaposition and superposition to form a matrix 9. According to a preferred embodiment, the matrix 9 is a matrix of vertical-cavity surface-emitting laser (VCSEL) diodes 8, each diode 8 emitting for example a laser beam 10 of rated individual power on the order of 1 Watt at a wavelength situated in the short and medium infrared range—for example on the order of 1 µm.

At the scale of the preforms, the diodes 8 can be considered as point sources, each emitting directive radiation, i.e., in the form of a light beam 10, the solid half-angle of which is closed at the top, and preferably between 10° and 60°. The beam 10 can be symmetrical in revolution (i.e., of circular cross-section), or non-symmetrical in revolution (for example elliptical cross-section).

The object of the present application is not to describe in detail the structure of the matrix 9 of diodes 8. This is the reason the matrix 9 is represented in a simplified manner, in the form of a plate, the diodes 8 appearing in the form of points.

The heating unit 1 is designed to enable a modulation of the power (also called intensity) of the radiation emitted by each diode 8, or by groups of diodes.

In this instance, the matrix 9 is subdivided into a plurality of superimposed zones 9A, 9B, . . . , 9I, each zone grouping together a plurality of lines of diodes 8, the power of which is identical and modulated simultaneously. Such modulation can be performed electronically, the power of the diodes 8 of each zone 9A, 9B, . . . , 9I being for example displayed on a control monitor. Said monitor can be a touch screen, and can display for each zone a cursor, the movement of which causes the modulation of the power of the radiation emitted by the diodes 8 of the zone 9A, 9B, . . . , 9I to a value between a predetermined minimum value $P_{min}$ (for example zero) and a maximum value $P_{max}$ corresponding for example to the rated power of the diodes 8.

Represented in FIG. 2 is a particular case of subdivision of the matrix 9 into superimposed zones 9A, 9B, . . . , 9I of equal height, shown in the figure by the brackets visible at the right. It can be seen in the drawing that the height of the body 4 of the preform 2 is less than that of the matrix 9, which is in fact adapted to heating preforms 2 of varied heights. Also, only the active zones 9A, 9B, . . . , 9I facing the preform 2 and for which the radiation is likely to reach it are shown in the figure, the zones situated below being considered as inactive, i.e., either they are completely turned off, or when the minimum value $P_{min}$ is not zero, their power is by default set at said minimum value. Arbitrarily, and for purposes of readability, a low density of diodes 8 is represented in FIGS. 1 to 3, such that each zone 9A, 9B, . . . , 9I comprises only three lines of diodes 8. In practice, the density of diodes on a VCSEL plate is much greater, and each zone 9A, 9B, . . . , 9I can comprise a number of lines of diodes 8 much greater than three.

Each preform 2 is to be heated selectively, so as to obtain variations in the wall temperature of the body 4 along its axis A, and more specifically, alternating hot and cold annular regions (or bands) 4A, 4B, . . . , 4I.

To that end, the power of the zones 9A, 9B, . . . , 9I is set alternately at a high value (equal to the maximum or close thereto, i.e., with an attenuation of 10% or 20%) and at a low value (equal to the minimum or close thereto, i.e., with an augmentation of 10% or 20%), ensuring that the upper zone 9A, located facing the region beneath the neck of the body 4 and the lower zone 9I, located facing the bottom, are set at the high value. The diodes 8 and the zones where the power of the diodes 8 is set at the high value are considered to be "lighted," and the diodes 8 and the zones where the power of the diodes 8 is set at the low value are considered to be "unlighted." The power diagram can be seen at the left in FIG. 4. As can be seen, said diagram is crenellated.

This setting is also illustrated in FIG. 3, where the light beams 10 emitted by the lighted diodes 8 from zones 9A, 9C, 9E, 9G, 9I are represented, the diodes 8 that are turned off being considered as not emitting any radiation or radiation too weak to be taken into consideration.

As can be seen, in spite of the divergence of the light beams 10 emitted by each diode, radiating around an axis X corresponding to the bisector of the solid angle of the beam 10 (said bisector is perpendicular to the internal face of the matrix 9 and to the axis A of the preform 2), bands 4B, 4D, 4F, 4H of the body 4 are not subjected to the direct radiation from the matrix 9. A band 4A, 4C, 4E, 4G, 4I of the body 4 subject to direct radiation from the diodes 8 is said to be "lighted," and a band 4B, 4D, 4F, 4H of the body 4 that is not subject to direct radiation from the diodes 8, or is subject to low, marginal radiation from diodes 8 that are not situated facing said band, and the power distribution of which is Gaussian, is said to be "unlighted."

Although the optical effects (diffraction, diffusion, reflection) related to the preform 2 itself are considered negligible, the effective presence of unlighted bands 4B, 4D, 4F, 4H depends on a plurality of adjustable parameters, in particular:

the solid angle of the light beams 10,
the height of the lighted zones 9A, 9C, 9E, 9G, 9I and the height of the unlighted zones 9B, 9D, 9F, 9H (corresponding to the separation between the lighted zones 9A, 9C, 9E, 9G, 9I),
the distance of the preform 2 to the matrix 9,
the possible presence of reflectors facing the matrix 9.

Furthermore, the possible presence of reflectors facing the matrix 9 can also have an influence on the distribution of the radiation along the preform 2.

Thus, a person skilled in the art can adjust these factors to obtain the desired alternating lighted bands 4A, 4C, 4E, 4G, 4I and unlighted bands 4B, 4D, 4F, 4H.

In the example illustrated in FIG. 3, the solid angle of the lighted diodes 8 is about 22°; the height of the zones 9A-9I (lighted or unlighted) and the distance of the preform 2 to the matrix 9 are such that alternating lighted bands 4A, 4C, 4E, 4G, 4I and unlighted bands 4B, 4D, 4F, 4H appear on the body. An absorbent (or reflective) plate 11 is disposed horizontally in the space between the radiating wall 7 and the preforms 2, at the level of the collar 6, to preserve the neck 4 from the infrared radiation.

Given the divergence of the beams 10 from the lighted diodes 8, said beams overlap and combine to form, for each lighted zone 9A, 9C, 9E, 9G, 9I, a multiple beam of Gaussian power distribution: maximum at the center and decreasing progressively on the edges. This is the reason the power of the radiation effectively received by the preform 2 does not exactly correspond to that of the diagram represented at the left in FIG. 4, but has continuous variations between:

maximums, located at central points of the lighted bands 4A, 4C, 4E, 4G, 4I situated to the right of the median lines of the corresponding lighted zones 9A, 9C, 9E, 9G, 9I, and
minimums, located at central points of the unlighted bands 4B, 4D, 4F, 4H, situated to the right of the median lines of the corresponding unlighted zones 9B, 9D, 9F, 9H.

Figure 4:
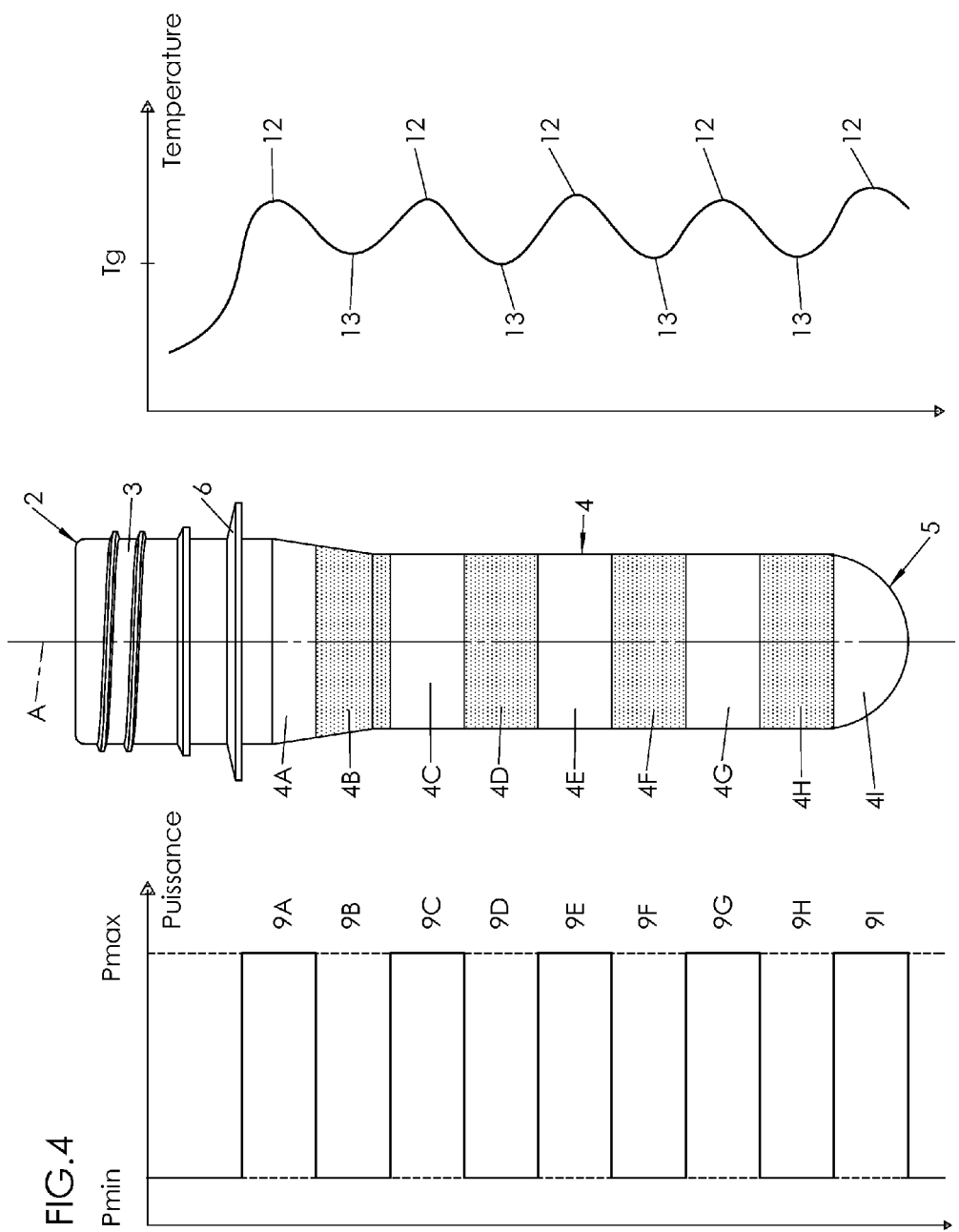
FIG. 4 is a diagram showing at the center a selectively heated preform, on the left, a diagram illustrating the profile of the intensity radiated by the sources facing the preform, and on the right, a thermogram illustrating the variations in temperature of the preform.

On the preform 2 of FIG. 4, facing the power diagram at the left, the unlighted bands 4B, 4D, 4F, 4H are represented as shaded, and the lighted bands 4A, 4C, 4E, 4G, 4I are represented in white. As can be seen in the drawing, the lighted and unlighted bands alternate along the axis A of the body 4. In light of the foregoing explanations, it will be understood that this drawing is diagrammatic. Indeed, the alternation of lighted and unlighted bands is not so clearly defined since the variation of the radiation received by the preform 2 is continuous.

In the diagram to the right of FIG. 4, facing the preform, a thermogram represents the variations of the wall temperature of the body 4, as exposed to the infrared radiation of the diagram at the left of the figure. This diagram is representative of the radiation power effectively absorbed by the preform 2. It will be noted that the thermogram has a substantially sinusoidal profile, with alternating peaks 12 (i.e., maximums) corresponding to the centers of the lighted bands 4A, 4C, 4E, 4G, 4I, and lows 13 (i.e., minimums) corresponding to the centers of the unlighted bands 4B, 4D, 4F, 4H.

Depending on the type of diode used (i.e., depending on the rated power of the diodes 8 and the solid angle of the beam 10), the power setting of the lighted zones 9A, 9C, 9E, 9G, 9I and the distance setting of the preform 2 to the matrix 9 are selected so that the temperature corresponding to the peaks 12 is far higher than the glass transition temperature of the material (which is about 80° C. in the case of PET), and the temperature corresponding to the lows 13 is higher than the glass transition temperature $T_g$, but very close thereto.

The expression "far higher" means that the peak temperature 12 is at least 20% higher than the glass transition temperature; the term "close to" means that the low temperature 13 is not more than 10% higher than the glass transition temperature. Moreover, because the neck 3 is not lighted (or very little, since it is isolated by the plate), the wall temperature there is low, i.e., close to the ambient temperature.

Thus, upon completion of heating, the body 4 of the preform 2 has alternating hot bands (corresponding to the lighted bands 4A, 4C, 4E, 4G, 4I), the wall temperature of which (measured substantially on a median line of the band) is far higher than the glass transition temperature of the material, and comparatively colder bands (corresponding to the unlighted bands 4B, 4D, 4F, 4H), the temperature of which (also measured substantially on a median line of the band), is close to the glass transition temperature $T_g$. In other words, the body 4 has alternating bands of high deformability (the hot bands) due to the temperature far higher than the glass transition temperature, and bands of low deformability (the cold bands), due to the temperature close to the glass transition temperature.

Figure 6:
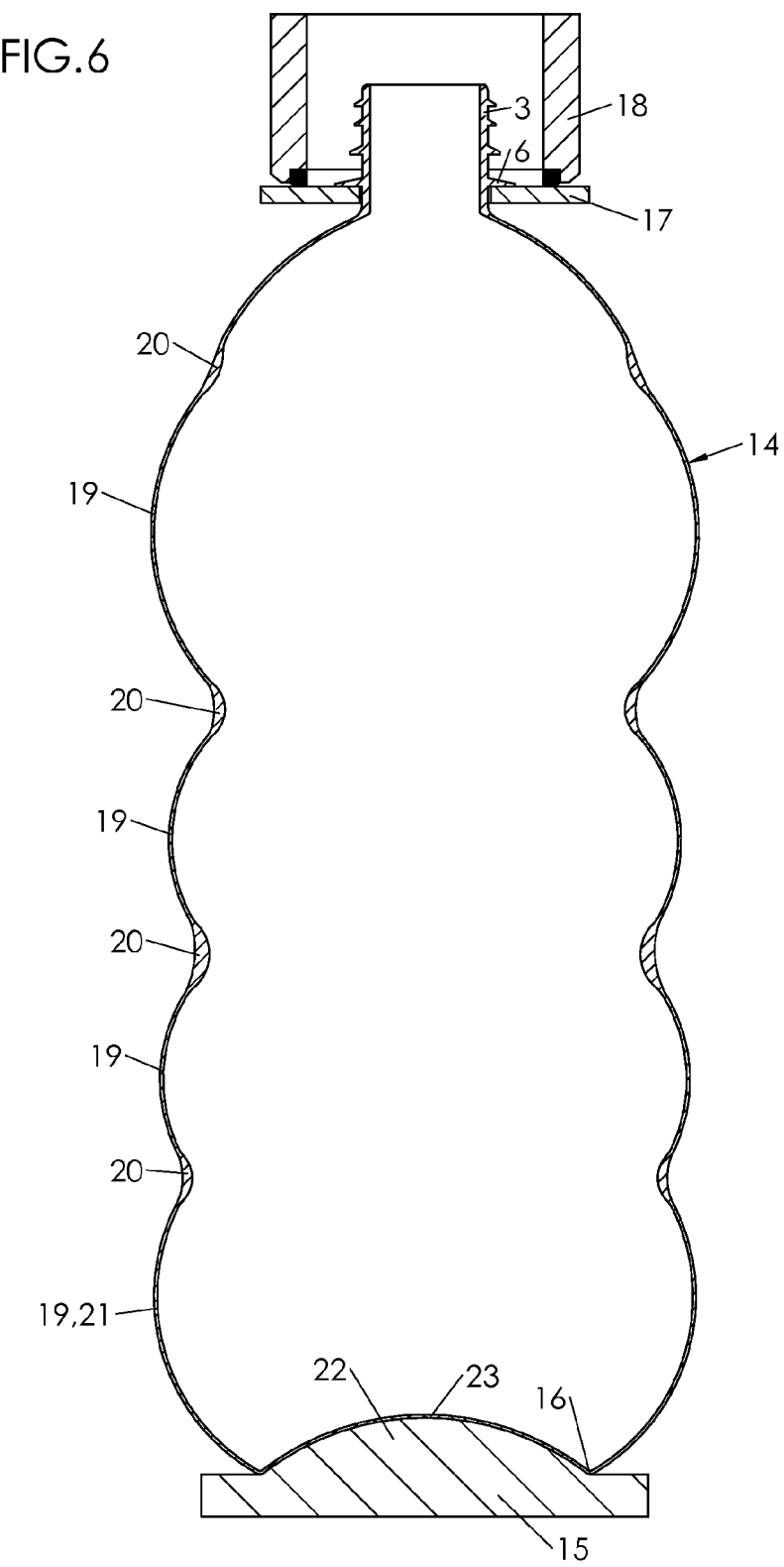
FIG. 6 is a view in cross-section showing a variation of realization of the container.

A preform 2 thus heated produces surprising results when the forming of a container 14 is done by free expansion, i.e., it is not done inside a mold having a cavity side wall for a container. In practice, the blowing can be:

completely free (FIG. 5), i.e., with no lateral or lower guide surface against which the material would be applied during forming, whether at the level of the body 4 or of the bottom 5 of the container 14, or partially free, i.e., in spite of the absence of any cavity wall for the container, with a surface against which the container can be locally pressed, such as:

a cylindrical caliper providing the axial guidance and limitation of the diameter of the bubble in development, or a mold bottom 15 configured to form a seat 16 on the bottom 5 of the container (an annular seat, for example, as illustrated in FIG. 6) intended to ensure the stability of the container 14 when placed on a flat surface.

In practice, the hot preform 2 is simply mounted on a support 17 from which it is suspended by its collar 6. A fluid under pressure (for example a gas such as air, or a liquid) is then injected into the preform 2 by means of a nozzle 18, which covers the neck 3 and is sealably applied to the support. The injection of the fluid, at an appropriate pressure, causes the blowing of the container 14.

As can be seen, this final container 14 has annular bulbous zones 19 (hereinafter called bulbs), with concavity facing the interior of the container 14, and annular narrowed zones 20 (or recesses, hereinafter called belts) with concavity facing the exterior, the overall diameter of which is less than that of the bulbs 19. Consequently, it will be noted that there is an inversion of the wall curvature of the container 14 between the bulbs 19 and the belts 20.

Figure 5:
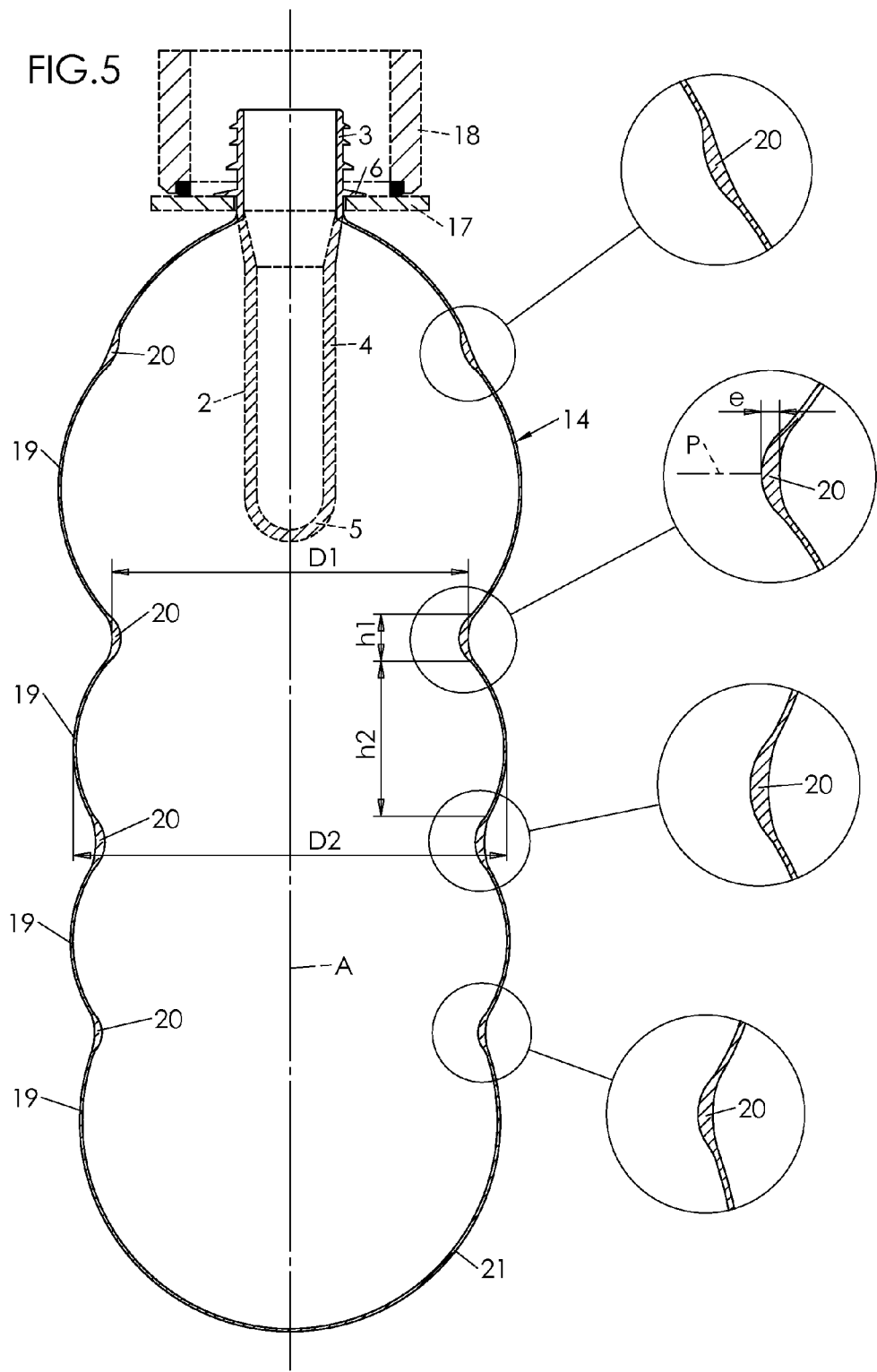
FIG. 5 is a view in cross-section showing the preform in dotted lines, and the formed container in solid lines; insets show certain details of the wall of the container, in larger scale.

It can be seen in FIG. 5, and more specifically in the detail views on the right, that:

the belts 20 have a wall thickness that is greater than that of the bulbs 19, the belts 20 have an axial extension or height h1 that is far less than the height h2 of the bulbs, in a ratio of at least 1 to 3 (in the lower part of the container 14 in the figures), even 1 to 5 (in the upper part of the container 14);

the wall thickness of the bulbs 19 is substantially constant;
on the contrary, the wall thickness of the belts 20 is variable, the belts 20 having a crescent moon-shaped radial cross-section, with a maximum thickness e in a median plane P perpendicular to the axis A of the body 4;
the wall thickness of the container 14 at the median plane P of the belts 20 is equal to or greater than double the wall thickness at the bulbs 19;
the belts 20 all have substantially equal overall diameters D1;
similarly, except for the neck, the bulbs have substantially equal overall diameters D2, larger than those of the belts.

The bulbs 19 correspond to the hot bands 4A, 4C, 4E, 4G, 4I of the preform, of high deformability; the belts 20 correspond to the cold bands 4B, 4D, 4F, 4H, of low deformability.

It is noted during blowing that the cold bands 4B, 4D, 4F, 4H (becoming the belts 20) act as an axial guide for the development of the bubble, which, by deformation of the preform 2 under the pressure from the fluid injected through the neck 3, progressively gives the final container 14 its shape. Indeed, as the bubble is deployed, the belts 20 preserve their position, i.e., they are maintained in planes perpendicular to the principal axis A of the body 4 of the preform 2, while being separated axially from each other as the bulbs 19 develop, which progressively separate them.

The cold bands 4B, 4D, 4F, 4H are sufficiently deformable to be suitably stretched radially under average pressure (less than 10 bars, even about 5 bars), and as illustrated in FIGS. 5 and 6, it is noted that the increase in the diameter of the preform 2 at the belts 20 is rather large.

On the other hand, because their material temperature is close to the glass transition temperature $T_g$, the cold bands 4B, 4D, 4F, 4H are not sufficiently deformable to be stretched axially in a substantial manner. Indeed, the axial stretching is small, less than 50% (i.e., the belts 20 of the container have a height less than 1.5 times the height of the cold bands 4B, 4D, 4F, 4H of the preform 2). It is noted that the wall thickness of the container 14 at the belts 20 is substantially equal to (in fact slightly less) than the wall thickness of the preform 2.

Finally, the material of the belts 20 of the final container is essentially mono-oriented in the radial direction, while the material of the bulbs 20 is bi-oriented, both radially and axially.

The ratio D1/D2 between the diameters D1 of the belts 20 and the diameters D2 of the bulbs is between 3/5 (particularly in the upper part of the container 14, at the neck) and 4/5 (particularly in the lower part of the container 14).

As we have seen, the blowing can be completely free (FIG. 5), the container 14 then having a bottom 21 in the form of a spherical skullcap due to its development being unconstrained by any wall.

The blowing can also be partially free (FIG. 6), the bottom 21 of the container 14 being shaped by means of a mold bottom 15 disposed in the axis A of the preform 2 and against which the material is applied at the end of blowing. In the illustrated example, the mold bottom 15 has a convex central portion 22 (for example in the form of a spherical skullcap) so as to form on the bottom 21 of the container a concave arch 23 projecting into the container 14, the periphery of which arch forms an annular seat 16 by which the container 14 can rest stably on a flat surface such as a table.

Following is a summary of the obvious advantages of the method described above, and of its results.

Firstly, the selective heating of the preform 2 by infrared radiation from directive monochromatic sources (such as laser) is sufficiently precise to obtain marked temperature variations between clearly defined alternating hot and cold bands, unlike conventional heating such as described in the aforementioned French patent FR 2 703 944 where the temperature variations are extremely progressive. As we have seen, it is even possible not to light certain bands of the preform 2 at all, which, although being heated by thermal conduction in the vicinity of the lighted bands, are heated only to a controlled temperature slightly above the glass transition temperature $T_g$ of the material. The low deformability of these cold bands 4B, 4D, 4F, 4H, the cold bands 4B, 4D, 4F, 4H alternately associated with the hot bands 4A, 4C, 4E, 4G, 4I on the preform 2, makes it possible to ensure during free blowing a precise axial guidance of the expanding bubble, with no notable deviation. This is not the case in ordinary free blowing, as described in French patent FR 2 848 906 (Sidel), where off-axis deviations of the bubble are often noted, which results in containers of uncontrolled shape (most often in the general shape of a kidney bean).

Secondly, the free blowing does not compromise the structural rigidity of the container 14. In fact, the rigidity of the container 14 described above and illustrated in FIGS. 5 and 6 is exceptional. Said rigidity is the result of:
first, the ringed shape of the container 14, with its alternating bulbs 19 and belts 20;
extra thicknesses of material at the belts 20, where the resistance to deformation (particularly ovalization) is very high;
geometric shapes of the bulbs 19, the unconstrained development of which leads to a spherical shape that is naturally stable and strong (particularly in the axial direction).

Tests show: the crushing force necessary to cause the deformation (particularly ovalization) of the container 14 is far greater than the ordinary force required to grip the container 14 for normal use (handling, storage, opening, emptying). The container 14 thus obtained constitutes a major advance with respect to containers obtained by ordinary free blowing as described in the aforementioned French patent FR 2 848 906, in which the mechanical stability of the containers is very low, the slightest pressure when held in the hand causing the collapse of the wall.

Thirdly, as tests have shown, thanks to the precision of the selective heating, the entire process of manufacturing containers has excellent repeatability, any differences that may exist between two containers 14 produced from the same process (with identical settings for radiation and blowing pressure) being imperceptible to the naked eye. There is therefore no loss of perceived quality in comparison with blowing performed by mold; thus, the method can be industrialized on a large scale.

Fourthly, given the cost of molds and the time spent in their design, installation and maintenance, the absence of a mold makes it possible to realize substantial economies. This advantage appears latent in the known free blowing mentioned above, but the defects in appearance of the container, inherent in the method employed, limit it to certain markets where the appearance of the container is not essential. On the contrary, with the method described above, the containers obtained have an appearance that, although it may be subject to improvements, is acceptable everywhere in the world, including in markets where the appearance of the container is essential.

Fifthly, as we have seen, the forming can be done at average pressures (less than 10 bars, and even about 5 bars), which are far less than the high pressures (above 20 bars) required when the forming is performed in a mold (without said high pressures, the forming of the container against the wall of the mold is not complete). This results in substantial savings of energy, since the blowing can be done from an ordinary pneumatic supply at 7 bars, which can possibly be decreased, while ordinary forming requires dedicated, energy-consuming pneumatic lines that require strict safety measures.

The invention claimed is:

1. A method of manufacturing a container from a preform of thermoplastic material having a body extending along a principal axis, the method comprises:
   a selective heating step in which the body of the preform is exposed to a radiating wall in front of which the preform travels, the radiating wall having an internal face lined with a plurality of electromagnetic radiation sources emitting monochromatic or pseudo-monochromatic and directive electromagnetic infrared radiation towards the preform, the plurality of electromagnetic radiation sources being organized to form a matrix, a beam emitted by each electromagnetic radiation source radiating around an axis corresponding to a bisector of a solid angle of the beam, the bisector being perpendicular to the internal face and to the principle axis of the perform, power of the plurality of electromagnetic radiation source being modulated along the principal axis of the body in such a way that said body has alternating hot annular regions, a temperature of which is far higher than a glass transition temperature of the thermoplastic material, and comparatively colder annular regions, a temperature of which is close to the glass transition temperature;
   a forming step in which a gas under pressure is injected into the preform thus heated, said step being carried out in free expansion.

2. The method according to claim 1, wherein in the selective heating step, the power of the radiation is regulated by zones alternately at a high value and a low value.

3. The method according to claim 1, wherein the power of the radiation is modulated in such a way that some annular regions of the body of the blank preform are not lighted.

4. The method according to claim 1, wherein the power of the radiation is modulated in such a way that a peak temperature of the hot annular regions is far higher than the glass transition temperature of the thermoplastic material, and in such a way that the lowest temperature of the cold annular regions is close to the glass transition temperature of the thermoplastic material.

5. The method according to claim 1, wherein the forming is carried out in total absence of any guide surface.

6. The method according to claim 1, wherein the forming is carried out with a provision of a mold bottom to form a seat on the container.

7. The method according to claim 1, wherein the gas pressure injected during forming is less than 10 bars.

8. The method according to claim 3, wherein the gas pressure injected during forming is about 5 bars.

9. The method according to claim 1, wherein the infrared radiation is a laser radiation.

10. The method according to claim 9, wherein the radiation is produced by vertical-cavity surface-emitting laser diodes.

* * * * *